United States Patent
Katsuyoshi et al.

(10) Patent No.: US 10,399,424 B2
(45) Date of Patent: Sep. 3, 2019

(54) SUNROOF DEVICE

(71) Applicant: AISIN WUXI BODY PARTS CO., LTD., Jiangsu (CN)

(72) Inventors: Iwashita Katsuyoshi, Jiangsu (CN); Kazuki Sawada, Jiangsu (CN)

(73) Assignee: AISIN WUXI BODY PARTS CO., LTD., Jiangsu (CN)

( * ) Notice: Subject to any disclaimer, the term of this patent is extended or adjusted under 35 U.S.C. 154(b) by 39 days.

(21) Appl. No.: 15/720,946

(22) Filed: Sep. 29, 2017

(65) Prior Publication Data
US 2018/0272850 A1 Sep. 27, 2018

(30) Foreign Application Priority Data

Mar. 13, 2017 (CN) .................. 2017 2 0239490 U

(51) Int. Cl.
*B60J 10/82* (2016.01)
*B60J 7/043* (2006.01)
*B60J 7/047* (2006.01)

(52) U.S. Cl.
CPC ............... *B60J 10/82* (2016.02); *B60J 7/043* (2013.01); *B60J 7/047* (2013.01)

(58) Field of Classification Search
CPC ... B60J 10/82; B60J 7/047; B60J 7/043; B60J 7/0435; B60J 7/05; B60J 7/053; B60J 10/90
(Continued)

(56) References Cited

U.S. PATENT DOCUMENTS 6,598,349 B1 * 7/2003 Balbaugh .................. E06B 7/16
                                                    49/475.1
8,807,639 B2 * 8/2014 Sawada .................... B60J 7/053
                                                    296/216.06
(Continued)

FOREIGN PATENT DOCUMENTS

| CN | 203246299 U | 10/2013 |
| JP | 2013-237422 A | 11/2013 |
| JP | 2015-163496 A | 9/2015 |

OTHER PUBLICATIONS

Office Action dated Jul. 3, 2018 in Japanese Patent Application No. 2017-183577, with English translation citing document AO therein, 5 pages.
(Continued)

*Primary Examiner* — Dennis H Pedder
(74) *Attorney, Agent, or Firm* — Oblon, McClelland, Maier & Neustadt, L.L.P.

(57) ABSTRACT

The invention provides a sunroof device with good overall appearance. The sunroof device having: a first panel, a second panel and a weather strip, which is located between the first panel and the opening and between the second panel and the opening, and mounted along an inner peripheral edge portion of the opening. The weather strip has a first weather strip portion disposed at a position corresponding to a part of the opening and a second weather strip portion disposed at a position corresponding to another part of the opening, wherein, a first protrusion amount that the first weather strip portion protrudes from the inner peripheral edge portion of the opening toward the first panel is smaller than a second protrusion amount that the second weather strip portion protrudes from the inner peripheral edge portion of the opening toward the second panel.

2 Claims, 3 Drawing Sheets

(58) Field of Classification Search
USPC ............. 296/216.02–216.05, 216.07–216.09, 296/220.01; 49/482.1
See application file for complete search history.

(56) References Cited

U.S. PATENT DOCUMENTS

| | | | |
|---|---|---|---|
| 8,991,911 B2 * | 3/2015 | Nabuurs | B60J 7/053 296/216.03 |
| 9,290,085 B2 * | 3/2016 | Sawada | B60J 7/043 |
| 2013/0307296 A1 | 11/2013 | Sawada | |
| 2015/0246600 A1 | 9/2015 | Sawada et al. | |

OTHER PUBLICATIONS

Chinese Office Action dated Sep. 29, 2017 in Patent Application No. 201720239490.X, 2 pages.

German Office Action dated Oct. 6, 2017 in Patent Application No. 20 2017 105 940.5, 1 page.

\* cited by examiner

SUNROOF DEVICE

BACKGROUND OF THE INVENTION

Field of the Invention

The invention relatives to a sunroof device mounted on a roof of a vehicle.

Description of Related Art

It is previously known a sunroof device, which includes: a movable panel, which can be lifted up and moved along a front-rear direction for opening and closing a part of an opening formed on a roof of a vehicle; a fixed panel, which is mounted on the roof of the vehicle at a position more backward than the movable panel, so as to close the other part of the opening; and a weather strip, which is located between the movable panel and the opening and between the fixed panel and the opening, and mounted along inner peripheral edge portion of the opening, a distance of the weather strip from the inner peripheral edge of the opening to the movable panel is equal to that from the inner peripheral edge of the opening to the fixed panel.

Therefore, within the sunroof device, at front-rear direction of the vehicle, the width of the weather strip along width direction of the vehicle is the same, i.e., the width is large, thus, the weather strip has poor appearance. In addition, within this structure, when the movable panel is moved up and down, the support piece is rubbed against the weather strip, and thus will cause unstable sliding and the weather strip will be broken.

SUMMARY OF THE UNITY MODEL

The invention has been made in view of the above problems, and an object of the present invention is to provide a sunroof device having a good appearance, a stable sliding resistance and being capable of decreasing the damage of the weather strip.

The sunroof device of the invention has: a first panel, which is used for opening and closing a part of an opening formed on a roof of a vehicle, a second panel, which is mounted on the roof and used for closing another part of the opening, wherein the second panel is located at rear of the first panel on the front-rear direction of the vehicle in a state that the first panel closes the part of the opening, the first panel slides above the second panel when the first panel opens the part of the opening; and a weather strip, which is located between the first panel and the opening and between the second panel and the opening, and mounted along an inner peripheral edge portion of the opening, characterized in that: the weather strip has a first weather strip portion and a second weather strip portion, wherein, the first weather strip portion is disposed at a position corresponding to the part of the opening, the second weather strip portion is disposed at a position corresponding to the another part of the opening, a first protrusion amount that the first weather strip portion protrudes from the inner peripheral edge portion of the opening toward the first panel is smaller than a second protrusion amount that the second weather strip portion protrudes from the inner peripheral edge portion of the opening toward the second panel.

Figure 1:
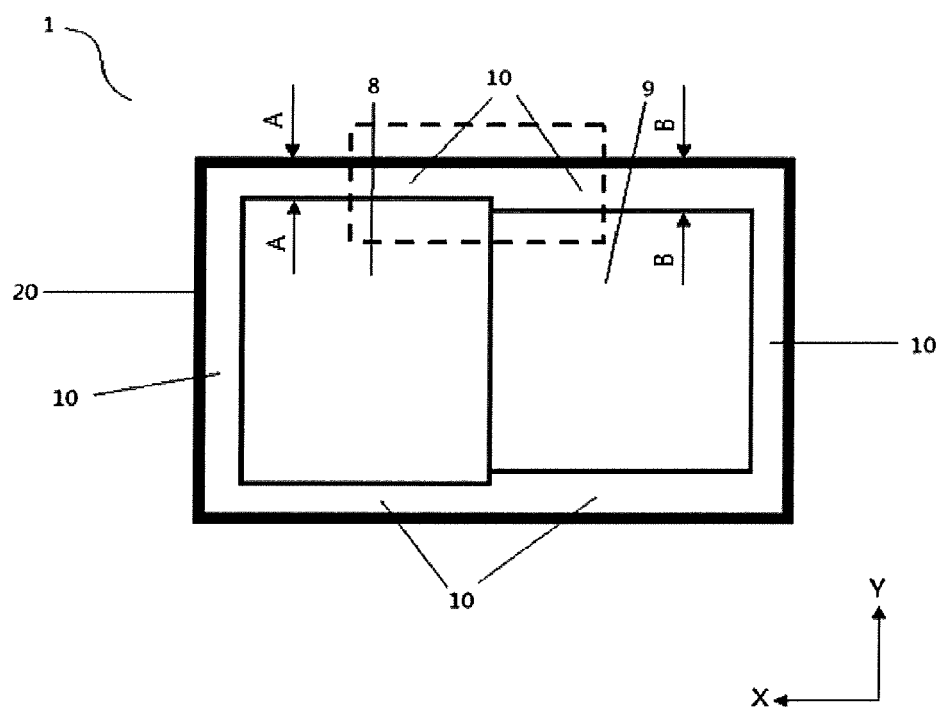
FIG. 1 is a schematic top view showing a sunroof device of the invention.

DESCRIPTION OF THE REFERENCE NUMBER 5 movable member
7 guide rail
8 first panel
9 second panel
10 weather strip
101 first weather strip portion
102 second weather strip portion
e1 first protrusion amount
e2 second protrusion amount

DETAILED DESCRIPTION OF THE INVENTION

The preferred embodiment of the invention will be described in accordance with the accompanying drawings.

In the following drawings, a front-rear direction of a vehicle is set as X direction, and a width direction of the vehicle is set as Y direction, and an up-down direction of the vehicle is set as Z direction.

FIG. 1 is a schematic top view showing the sunroof device of the invention. As shown in FIG. 1, the sunroof device of the invention comprising: a first panel 8, a second panel 9 and a weather strip 10. The first panel 8 may slide on the front-rear direction X of the vehicle to open and close a part of an opening 20 formed on a roof 1 of the vehicle. The second panel 9 is mounted on the roof and used for closing another part of the opening 20. The second panel 9 is located at rear of the first panel 8 on the front-rear direction X of the vehicle in a state that the first panel 8 closes the part of the opening 20, the first panel 8 slides above the second panel 9 when the first panel 8 opens the part of the opening 20. The weather strip 10 is located between the first panel 8 and the opening 20 and between the second panel 9 and the opening 20, and mounted along an inner peripheral edge portion of the opening 20.

Figure 2:
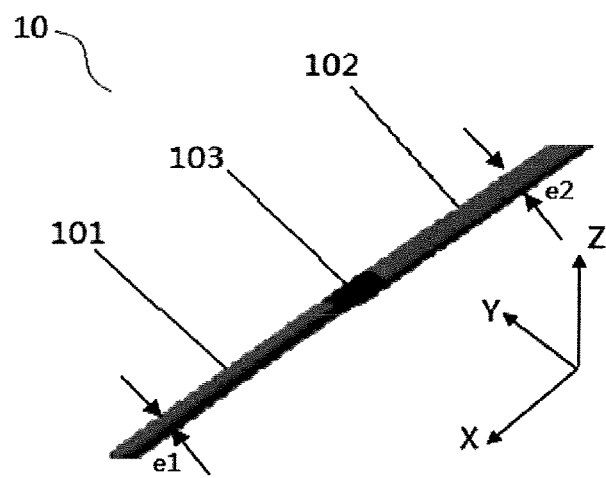
FIG. 2 is a partial enlarged view of the weather strip 10, which is taken out separately and expressed, in the range indicated by the dotted line in FIG. 1 of the sunroof device of the invention.

FIG. 2 is a partial enlarged view of the weather strip 10 in the range indicated by the dotted line in FIG. 1 of the sunroof device of the invention, which is taken out separately and expressed. As shown in FIGS. 1 and 2, the weather strip 10 has a first weather strip portion 101 and a second weather strip portion 102. The first weather strip portion 101 is disposed at a position corresponding to the part of the opening 20; the second weather strip portion 102 is disposed at a position corresponding to the other part of the opening 20.

As shown in FIG. 2, an engagement portion 103 which integrates the first weather strip portion 101 and the second weather strip portion 102 is provided between the first weather strip portion 101 and the second weather strip portion 102, thereby improving the overall appearance and stability of the roof device. Although not shown, the first weather strip portion 101 and the second weather strip portion 102 may not be formed integrally, but may be formed separately.

Figure 3A:
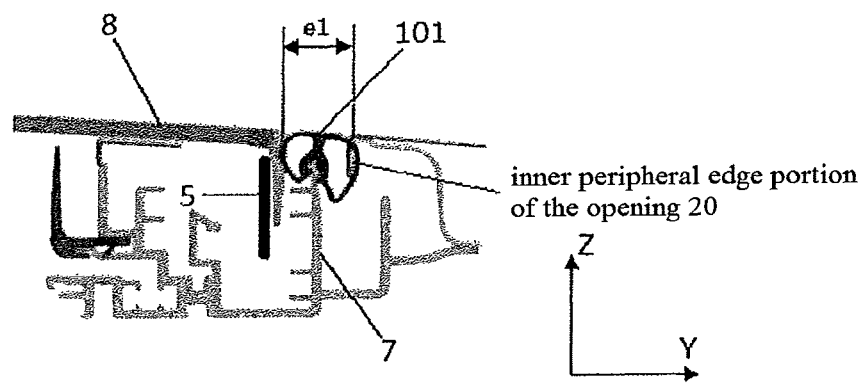
FIG. 3(a) is a cross-sectional view showing the sunroof device of the invention along the width direction of the vehicle taken along line A-A in FIG. 1 in which the weather strip is mounted to the roof.
Figure 3B:
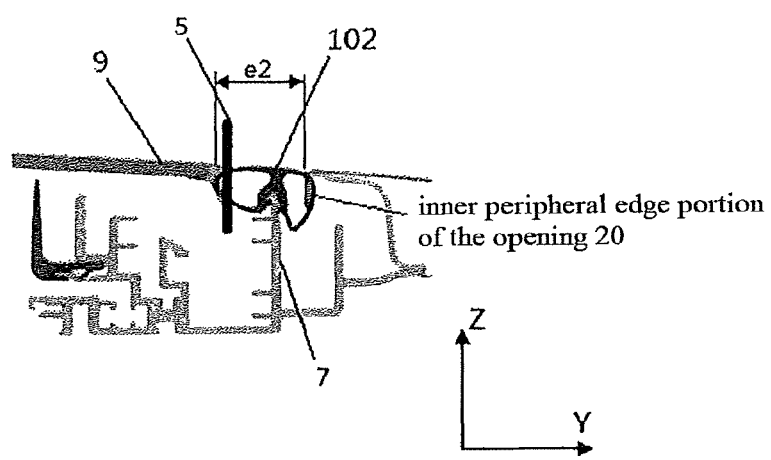
FIG. 3(b) is a cross-sectional view showing the sunroof device according to the invention along the width direction of the vehicle taken along line A-A in FIG. 1 in a state that a movable member shown in FIG. 3(a) lifts the first panel and causes the first panel to slide above the second panel backwardly.
Figure 3C:
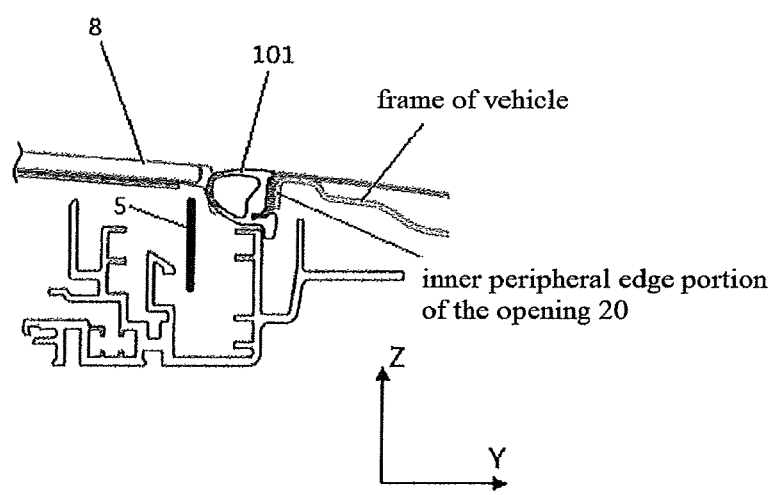
FIG. 3(c) is a cross-sectional view showing the sunroof device of the invention along the width direction of the vehicle taken along the line A-A in FIG. 1 in which the weather strip is mounted on a frame of vehicle.

FIG. 3(a) is a cross-sectional view showing the sunroof device of the invention along the width direction of the vehicle taken along line A-A in FIG. 1 in which the weather strip 10 is mounted to the roof; FIG. 3(b) is a cross-sectional view showing the sunroof device according to the invention along the width direction of the vehicle taken along line A-A in FIG. 1 in a state that a movable member 5 shown in FIG. 3(a) lifts the first panel 8 and causes the first panel 8 to slide above the second panel 9 backwardly; and FIG. 3(c) is a cross-sectional view showing the sunroof device of the invention along the width direction of the vehicle taken along the line A-A in FIG. 1 in which the weather strip 10 is mounted on a frame of vehicle. Hereinafter, only the structures shown in FIGS. 3(a) and 3(b) will be described.

As shown in FIG. 3(a), the first weather strip portion 101 is mounted to a guide rail 7 of the roof with its left end being in contact with the first panel 8 and its right end being in contact with the inner peripheral edge of the opening 20. Further, as shown in FIG. 3(b), the second weather strip portion 102 is mounted to the guide rail 7 of the roof, with its left end being in contact with the second panel 9 and its right end being in contact with the inner peripheral edge of the opening 20. It can be known from FIG. 3(a) and FIG. 3(b), a first protrusion amount e1 that the first weather strip portion 101 protrudes from the inner peripheral edge portion of the opening 20 toward the first panel is smaller than a second protrusion amount e2 that the second weather strip portion 102 protrudes from the inner peripheral edge portion of the opening 20 toward the second panel 9.

In such a manner, as shown in FIG. 3(a), the movable member 5 which is capable of holding the first panel 8 does not contact with the first weather strip portion 101 when the movable member 5 is driven by a drive slider (not shown) to move upwardly so as to lift the first panel 8. Further, as shown in FIG. 3(b), the movable member 5 contacts with the second weather strip portion 102 when the movable member 5 is driven by a drive slider (not shown) to lift the first panel 8 (not shown in FIG. 3(b)) and cause the first panel 8 to move backwardly.

According to above configuration, since the first protrusion amount e1 is smaller than the second protrusion amount e2, in the vehicle state, the weather strip in the front that a user cannot see has a reduced width, so as to improve the appearance and save the material.

In addition, as the movable member 5 which is capable of holding the first panel 8 does not contact with the first weather strip portion 101 when sliding on the part of the opening 20 as shown in FIG. 3(a), and contacts with the second weather strip portion 102 when sliding on the another part of the opening 20 as shown in FIG. 3(b), the first weather strip portion 101 may not bend upward, which improves the overall appearance and sliding resistance stability of the roof device and decreases the damage of the weather strip.

In addition, as shown in FIG. 2, as the engagement portion 103 which integrates the first weather strip portion 101 and the second weather strip portion 102 is provided between the first weather strip portion 101 and the second weather strip portion 102, the first weather strip portion 101 and the second weather strip portion 102 are formed integrally, and the overall appearance and stability of the roof device are advanced.

The invention are described hereinbefore, whereas the invention is not limited to this embodiment, and various modifications may be obtained without departing from the scope of thereof.

The invention claimed is:

1. A sunroof device, comprising:
a first panel which is to open and close a part of an opening formed on a roof of a vehicle,
a second panel which is mounted on the roof and is to close another part of the opening, wherein the second panel is located at rear of the first panel in a front-rear direction of the vehicle in a state when the first panel closes the part of the opening, and the first panel slides above the second panel when the first panel opens the part of the opening; and
a weather strip which is located between the first panel and the opening and between the second panel and the opening, and mounted along an inner peripheral edge portion of the opening, wherein
the weather strip includes a first weather strip portion and a second weather strip portion, wherein, the first weather strip portion is disposed at a position corresponding to the part of the opening, the second weather strip portion is disposed at a position corresponding to the another part of the opening,
a first protrusion amount that the first weather strip portion protrudes from the inner peripheral edge portion of the opening toward the first panel is smaller than a second protrusion amount that the second weather strip portion protrudes from the inner peripheral edge portion of the opening toward the second panel, and
a movable structure to hold the first panel does not contact with the first weather strip portion when sliding on the part of the opening, and contacts with the second weather strip portion when sliding on the another part of the opening.

2. The sunroof device according to claim 1, wherein an engagement portion which integrates the first weather strip portion and the second weather strip portion is provided between the first weather strip portion and the second weather strip portion.

* * * * *